Nov. 29, 1938. J. P. BRUNT ET AL 2,138,290
THICKNESS GAUGE
Filed Feb. 19, 1937
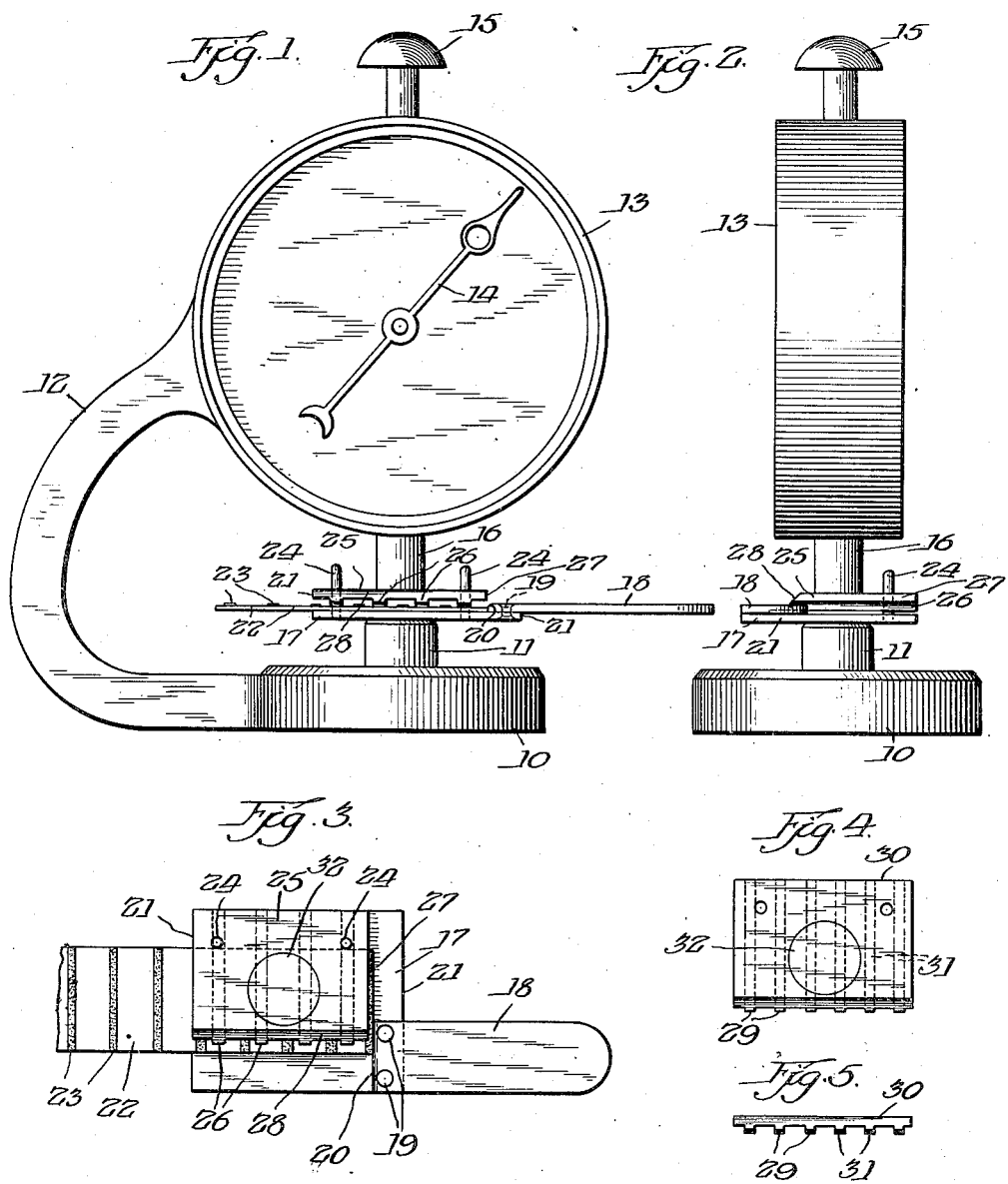
Inventors:
John P. Brunt and
Edward F. Maston Patented Nov. 29, 1938

2,138,290

UNITED STATES PATENT OFFICE 2,138,290

THICKNESS GAUGE

John P. Brunt, Chicago, and Edward E. Maston, Wilmette, Ill., assignors to Brunt & Company, Chicago, Ill., a corporation of Delaware Application February 19, 1937, Serial No. 126,658

2 Claims. (Cl. 33—147)

Our invention relates to a thickness gauge for use in measuring the thickness of paper board after it has been used as a facing in the manufacture of corrugated paper board cases.

Another and further object of our invention is the provision of a thickness gauge by means of which the thickness of liners or facings can be accurately determined after these facings have been removed from a corrugated box, and is adapted to be used in connection with the usual micrometer gauge now in use for measuring the thickness of liners, paper, and the like.

Paper board liners or facings are manufactured to specified thicknesses, and in this connection railroad and express classifications require that certain specified thicknesses of liners be used for specified sizes of containers which carry specified weights. If these liners or facings are found to be under the prescribed thickness, the boxes on which they are taken will not comply with the specifications of the various transportation companies, and goods shipped in such boxes are either subjected to a rate penalty or they are refused transportation by the carriers.

In determining the thickness of these liners it has been the practice heretofore to remove a section of the liner or facing from the box. In so doing, the glue, which is applied to the faces of these liners in predetermined spaced position to adhere to the corrugations of the center piece of paper board, remains on the surface of the liner so that accurate measurement of the thickness of such liner is impossible with the present type of gauges because the area at the foot of the anvil of the standard micrometer is approximately $\frac{1}{10}$ of a square inch or about $\frac{5}{8}$ of an inch in diameter. When one of these pieces of material is placed under the foot of the micrometer the measurement is taken through the thickness of material plus the thickness of glue, which, of course, does not give an accurate measurement of the thickness of the liner, the foot of the anvil being of such width that it may go across one or two rows of glue adhering to the liner. If the glue is scraped off a portion of the liner is removed with it, so that when the liner is measured after the glue is removed, the measurement is not accurate because it would be thinner at the portion of the surface where the liner is removed. Therefore it has not been possible to accurately measure the thickness of these liners. Some corrugated sheets have the bonds placed as close as 52 bonds per foot of board, other corrugated fibreboard is made with from 34 to 37 bonds to the foot, and in some instances there are variations in these accepted standards.

Another method which has been followed is to measure small strips which are cut from between the rows of glue, but in this case an inadequate area of the liner board is encompassed with the result that the liner board is slightly compressed resulting in an inaccurate measurement of the thickness of the material.

In our improved invention it is only necessary to cut a small piece of corrugated paper board from a box and strip the liner or facing therefrom, insert the liner between the upper and lower plates of the gauge, and thereafter place the gauge between a standard micrometer so that the accurate thickness of the liner can be very easily and quickly determined. The gauge may be constructed of any predetermined thickness so that by using a standard caliper the thickness of the gauge, less the reading on the standard caliper, gives the measurement of the thickness of the liner. If desired, where these liners are used constantly, the standard micrometer for use in measuring paper can be set so that its normal registry is an amount equal to the thickness of the two parts making up the gauge and then when the gauge is placed in the micrometer a direct and accurate reading determines the thickness of the material.

Another and further object of our invention is the provision of a thickness gauge having bars thereacross and a stop on one of the gauge members so that when a small strip of material is placed between the two members of the gauge the bars on one of the members are in contact with the liner between the rows of glue and in proper alignment to enable the operator to obtain an accurate measurement of the thickness thereof.

These and other objects of our invention will be more fully and better understood by reference to the accompanying sheet of drawing, and in which—

Figure 1 is a front elevational view of a standard paper micrometer with a gauge and a strip of fibreboard shown in position therein;

Figure 2 is a side view of the parts illustrated in Figure 1;

Figure 3 is an elevational view of the gauge shown in Figure 1;

Figure 4 is a top plan view of one of the parts of the gauge with the bars placed closer together so as to fit over glue bonds spaced closer than in the form shown in Figure 3; and Figure 5 is an edge view of the top gauge member shown in Figure 4.

Referring now particularly to the drawing and in which like reference characters refer to like parts throughout, a standard micrometer is illustrated in Figure 1, which comprises the base member 10 having an anvil 11 mounted thereon and in fixed relation with the base 10. An arm 12 supports a body member 13 having an indicating hand 14 on the face thereof, and a spring actuated member 15 which is connected to a foot 16. The apparatus thus far described is the ordinary commercial form of apparatus commonly used in the measurement of paper thicknesses.

Referring now particularly to Figure 3, in which is illustrated the gauge, we provide a lower gauge member 17 preferably rectangular in shape and having smooth faces on each side, with a handle 18 secured thereto by means of rivets 19. The inner edge 20 of the handle member 18 is parallel to the sides 21, 21 of the lower gauge member and extends slightly above the surface to form a stop or catch member for a liner strip 22 which is shown inserted in the gauge member with the rows 23 of glue extending thereacross. Fixedly mounted in this lower gauge member 17 is a pair of pins 24, 24 which extend at right angles to the face thereof, and over which an upper gauge member 25 is adapted to be fitted. On the face of the gauge member 25 adjacent the lower gauge member 17 is a plurality of bars 26, 26 in spaced relation with each other, extending transversely across the gauge member 25 and parallel to the side edges of this member so they can be fitted against the face or side of the liner strip 22 between the rows of glue 23. In other words, they straddle the rows of glue, particularly as shown in Figure 3, with the edge 27 in alignment with the edge 20 of the member 18.

The member 25 is beveled along its upper edge at 28, while the bars at one of their edges are beveled inwardly and downwardly as at 29 in order that the liner may be readily slipped between these two gauge members. The upper gauge member 25 is slightly lesser in width than the lower member 17 so that when the liner is placed in position it is laid flat on one edge of the member 17 and slipped under the upper gauge member 25.

In Figure 4 an upper member 30 is shown of exactly the same form as the upper member 25, except that the bars 31, 31 extend thereacross in slightly closer spaced relation than in the form shown in Figure 3. This device is adapted for use in measuring liners in which the rows of glue run something like 50 to 52 corrugations per foot, as distinguished from the form shown in Figure 3 which is adapted to be used in measuring paper having 34 to 37 corrugations per foot. In use, the members 25 and 30 are interchangeable and may be used with the same lower member so that a complete set is available for use by an operator in measuring liners having the various spaced glue joints as described above, or other spacings may be used in order that a proper fit may be had for any spacings of the glue joints which may differ from those described herein.

In operation, when it is desired to measure the thickness of a liner or facing from a corrugated box, a section of the box is taken off and a small piece of the liner stripped therefrom and turned in such position that the plain side is fitted against the member 21. If a square edge is presented it is inserted against the edge 20 of the handle member 18 and slipped into position between the upper and lower gauge members, the operator holding the handle 18. Thereafter, the gauge is placed between the anvil and foot of the micrometer illustrated in Figure 1, the plunger pressed downward, and the accurate thickness of the combined liner and gauge indicated on the dial of the micrometer.

In order that the gauge may be properly placed under the foot of the micrometer, a space 32 is provided as indicated at the central portion of the members 25 and 30. If desired, a standard micrometer could be provided with a smooth faced anvil, such as the gauge member 17, with a cooperating gauge member such as 25 or 30 attached to the stem instead of the smooth faced foot member now employed.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of our invention.

We claim:

1. A liner gauge comprising, in combination, a pair of gauge members, the cooperating face of one of said members having a plane face and the cooperating face of the other member a plurality of spaced bars thereon whereby the said member may be placed against the face of a liner having rows of glue thereon, means connecting the said gauge members in movable relation with each other, and a handle secured to one of said members, the inner end of which forms a stop whereby a liner may properly be positioned between said gauge members.

2. A liner gauge comprising, in combination, a pair of gauge members, the cooperating face of one of said members having a plane face and the cooperating face of the other member a plurality of spaced bars thereon whereby the said member may be placed against the face of a liner having rows of glue thereon, means connecting the said gauge members in movable relation with each other, and a handle secured at one of its ends to the face of the gauge member having the plane face at one end thereof, with the inner end of the handle extending parallel with the ribs on the other gauge member and forming an abutting stop for the liner to be measured.

JOHN P. BRUNT.
EDWARD E. MASTON.